United States Patent
Schweig

(10) Patent No.: US 7,478,182 B2
(45) Date of Patent: Jan. 13, 2009

(54) KEYBOARD, MOUSE, AND VIDEO (KVM) SESSION CAPTURE SYSTEM THAT STORES AND CAN PLAYBACK PORTIONS OF LIVE KVM SESSION VIA FORENSIC CAPTURE MODULE

(76) Inventor: Marc E. Schweig, 11 Regent Cir., Bernards Township, Basking Ridge, NJ (US) 07920

( * ) Notice: Subject to any disclaimer, the term of this patent is extended or adjusted under 35 U.S.C. 154(b) by 209 days.

(21) Appl. No.: 11/344,443

(22) Filed: Jan. 31, 2006

(65) Prior Publication Data

US 2007/0180160 A1 Aug. 2, 2007

(51) Int. Cl.
G06F 3/00 (2006.01)
G06F 13/00 (2006.01)
G06F 7/00 (2006.01)

(52) U.S. Cl. .............. 710/73; 710/7; 710/8; 710/9; 710/10; 710/29; 710/30; 710/62; 710/67; 715/704; 709/6; 709/220; 709/238

(58) Field of Classification Search .......... 710/7–10, 710/29, 30, 62, 67, 73; 709/238, 246, 220, 709/6; 715/704
See application file for complete search history.

(56) References Cited

U.S. PATENT DOCUMENTS

| | | | |
|---|---|---|---|
| 6,857,005 B2 * | 2/2005 | Kistler et al. ............ 709/203 |
| 7,099,893 B2 * | 8/2006 | Bischof et al. ............ 707/104.1 |
| 2003/0131257 A1 | 7/2003 | Frantz |
| 2003/0142122 A1 | 7/2003 | Straut et al. |
| 2004/0059782 A1 | 3/2004 | Sivertsen |
| 2005/0033777 A1 | 2/2005 | Moraes et al. |
| 2005/0055383 A1 | 3/2005 | Dias et al. |
| 2005/0071026 A1 | 3/2005 | Jaeger |
| 2005/0097149 A1 | 5/2005 | Vaitzblit et al. |
| 2005/0235079 A1 | 10/2005 | Chen |
| 2005/0246433 A1 * | 11/2005 | Carrigan et al. ............ 709/223 |
| 2005/0254775 A1 | 11/2005 | Hamilton et al. |
| 2005/0278728 A1 | 12/2005 | Klementiev |
| 2006/0294254 A1 * | 12/2006 | Emerson et al. ............ 709/238 |
| 2007/0079008 A1 * | 4/2007 | Leibovich et al. ............ 709/246 |

OTHER PUBLICATIONS

International Search Report and Written Opinion by the International Searching Authority, issued on Feb. 5, 2008, in the PCT application No. PCT/US07/01497.

* cited by examiner

Primary Examiner—Tammara Peyton

(57) ABSTRACT

Keyboard, mouse and video (KVM) capture session architecture that includes command center forensics. That is, redirector hardware (HW) and a command center forensics (CCF) appliance. The redirector HW includes a computer interface module (CIM) with a computer readable encoded media. The CIM is configured to record at least one KVM session. The computer readable encoded media is configured to instruct sending an identical copy of the recorded at least one KVM session to the CCF appliance. The CCF appliance being configured to store and playback the identical copy.

27 Claims, 3 Drawing Sheets

KEYBOARD, MOUSE, AND VIDEO (KVM) SESSION CAPTURE SYSTEM THAT STORES AND CAN PLAYBACK PORTIONS OF LIVE KVM SESSION VIA FORENSIC CAPTURE MODULE

BACKGROUND OF THE INVENTION

1. Field of the Invention

The present invention relates to command center forensics ("CCF") that saves sessions of users who connect to servers through keyboard, video and mouse ("KVM") switches. The reason for saving the KVM sessions is for purposes of trouble shooting, enabling failure analysis, auditing, logging, ensuring privacy, providing security surveillance, and facilitating maintenance. The KVM session includes keystrokes, mouse actions and full-motion video output of the server as well, e.g., KVMoIP (KVM over Internet Protocol) data. A viewer application is then used to view the captured files later.

2. Description of Related Art

In the event of a problem with server security, changes and/or data loss may arise. It would be desirable to have a saved KVM session that shows who and how the data was compromised.

In the event of a problem with server maintenance, a system administrator performing upgrades or other kinds of software maintenance on the server may cause a failure or error. It would be desirable to have a recorded KVM session that can easily show the exact steps taken leading to the failure of the server.

The inventors are unaware of any present commercial practice that addresses these server and maintenance problems effectively in a KVM environment. There are products sold as "PC Parent", "Spy Capture", etc, mostly to watch kids, students, spouses and employees, making sure they don't do anything undesired on their PCs. They are all windows applications, and do not perform continuous video recording. A type of video recording is done for television using a TiVo function.

These types of products are windows-based software that secretly records snapshots of the user's screen, records keystrokes and mouse movements. However, this is done at the operating system (OS) level, requiring Windows. It would be desirable to record sessions from the KVM switch, therefore not requiring any particular OS, and to pre-boot activity such as BIOS and POST screens.

BRIEF SUMMARY OF THE INVENTION

One aspect of the invention resides in storing KVMoIP data arising during a KVM session from a KVM switch and yet storing the KVMoIP data in a manner that enables retrieval of the KVMoIP data from storage for searching and playback purposes. Such is desirable over just displaying KVMoIP data.

BRIEF DESCRIPTION OF THE DRAWINGS

For a better understanding of the present invention, reference is made to the following description and accompanying drawings, while the scope of the invention is set forth in the appended claims.

DETAILED DESCRIPTION OF THE PREFERRED EMBODIMENTS

Figure 1:
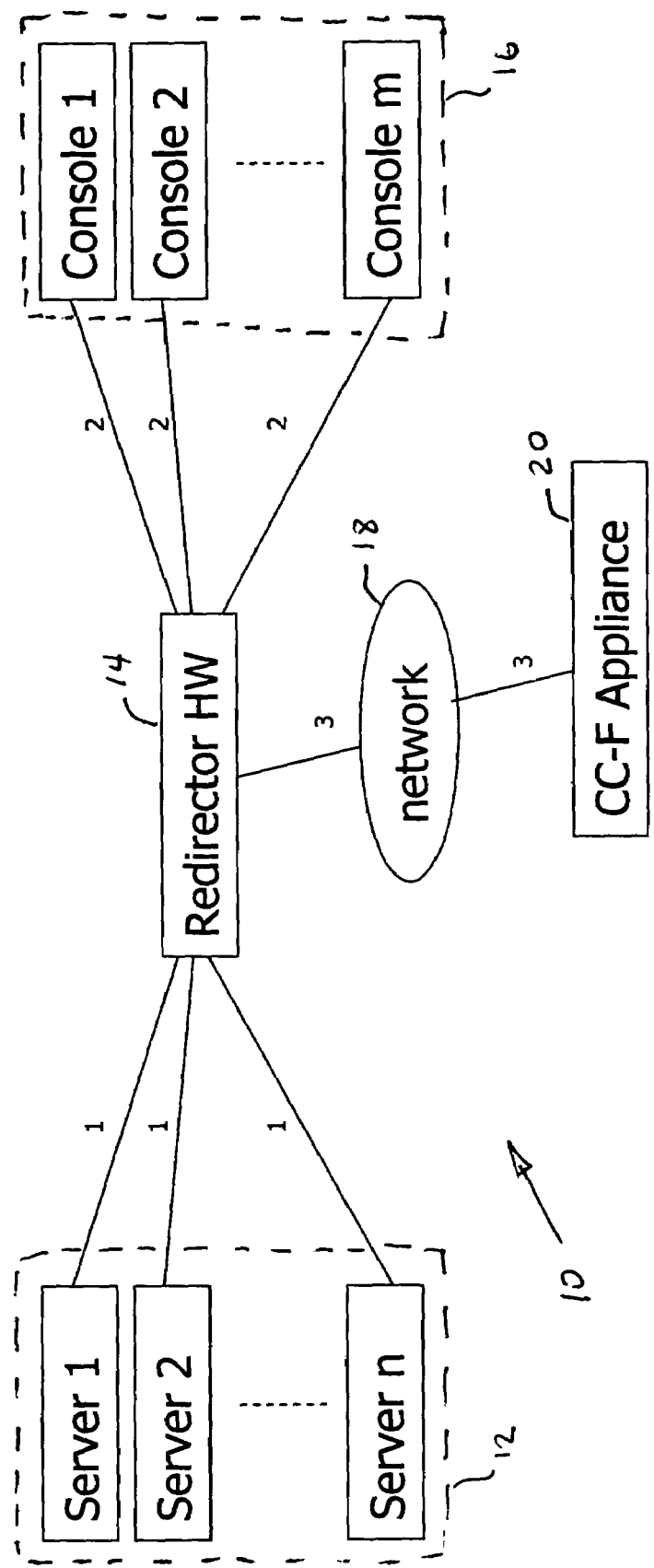
FIG. 1 is a schematic diagram of a command center forensics in accordance with the invention.

FIG. 1 shows command center forensics (CCF) 10 that records KVM activity of servers for purposes of trouble shooting, failure analysis, auditing, logging, privacy and security surveillance, including server security and server maintenance.

The CCF 10 includes redirector HW 14 to which the plurality of servers 12 are in communication via connections 1 and to which a plurality of consoles 16 (such as remote consoles) are in communication via connections 2. The redirector HW 14 uses a network 18 to communicate with a CCF appliance 20 via connections 3.

The connections 1 may be conventional KVM cables (PS/2 keyboard, mouse and HDB 15 monitor). If the server has a serial console, the connection would be a conventional serial cable, such as DB9.

The connections 2 may be conventional KVM cables and/or serial cables. The consoles 16 may be a regular keyboard, mouse and monitor, an analog KVM switch or a digital KVM switch, depending upon desired system configuration.

The connections 3 may be Ethernet cables. The redirector HW 14 converts the KVM signals to transmission control protocol/Internet protocol (TCP/IP) using a KVMoIP, such as the KVMoIP that is furnished by Raritan Computer. The redirector HW 14 then sends the data through the network 18 to the CCF appliance 20 for storage. The CCF appliance 20 is configured also to support RS-232 console recording of devices such as routers.

The redirector HW 14 may be any KVM over Internet Protocol (IP) device with the forensics software/firmware of the present invention, i.e., computer readable encoded media. Such KVM over IP devices are exemplified by a Raritan Computer Peppercorn LARA Express device, and a Raritan Computer Dominion KX digital KVM switch device, a Raritan Computer KX101 switch device and a Raritan Computer NGKX101 switch. Preferably, such redirector HW 14 supports RS-232 consoles as well. The redirector HW 14 with the forensics software/firmware of the present invention may be considered forensics computer interface modules (CIMs).

Figure 2:
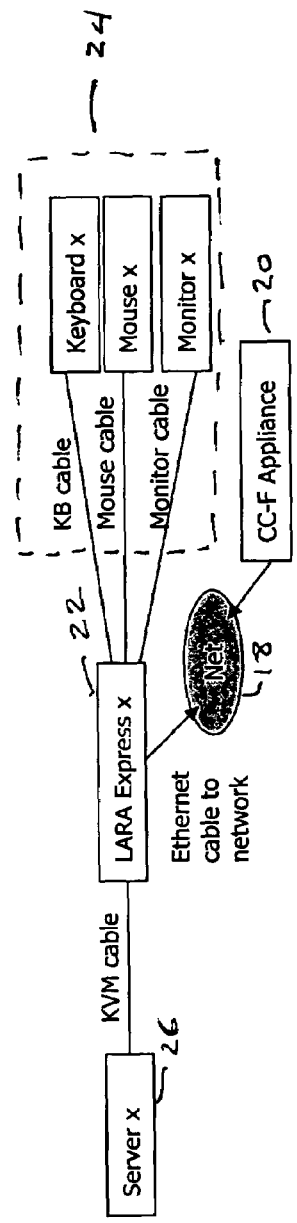
FIG. 2 is a schematic diagram of a command center forensics in accordance with a first embodiment, in which the redirector hardware ("HW") of FIG. 1 is exemplified by a Raritan Computer Peppercorn LARA Express device.

Turning to FIG. 2, the redirector HW 14 of FIG. 1 is exemplified by the Raritan Computer Peppercorn LARA Express device 22 and a conventional KVM console 24. One Raritan Computer Peppercorn LARA Express device 22 sits in between a server 26 and the associated KVM console 24. KVM data to and from the conventional KVM console 24 is read and digitized by the Raritan Computer Peppercorn LARA Express device 22 and sent to the CCF appliance 20 for storage. The link between the Raritan Computer Peppercorn LARA Express device 22 and the server x 26 and the conventional KVM console 24 may be through keyboard (KB) cable (PS/2 keyboard), mouse cable and monitor cable (KCB15). The link from the Raritan Computer Peppercorn LARA Express device 22 to the CCF appliance 20 via the network 18 may be with Ethernet cables.

Figure 3:
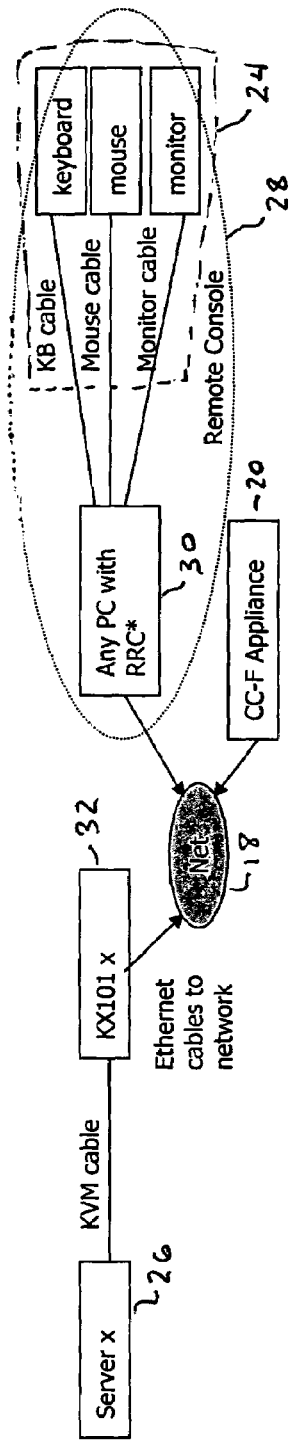
FIG. 3 is a schematic diagram of a command center forensics in accordance with a second embodiment, for which the redirector HW of FIG. 1 is exemplified by a Raritan Computer KX101 switch device.

Turning to FIG. 3, the KVM console 24 of FIG. 2 becomes part of a remote console 28 that also includes any personal computer ("PC") preferably equipped with Raritan remote client software ("RRC") 30. Instead of the Raritan Computer Peppercorn LARA Express device 22 of FIG. 2 as the redirector HW 14 of FIG. 1, a Raritan Computer KX101 switch device 32 is used. The KX101 switch device 32 provides KVMoIP control from a remote console control to the server 26 and sends a second, identical copy of that console session to the CCF appliance 20 for storage.

Figure 4:
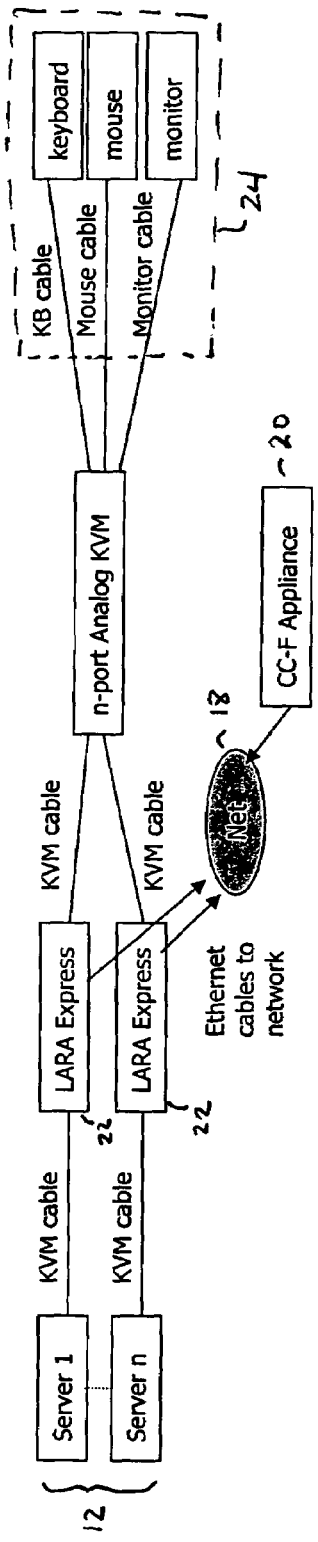
FIG. 4 is a schematic diagram of a command center forensics in accordance with a third embodiment, for which the redirector HW 14 is exemplified by the Raritan Computer Peppercorn LARA Express device of FIG. 2 and with an analog KVM switch.

Turning to FIG. 4, a modification of the arrangement as in FIG. 2 is depicted in that there is shown one KVM console 24 for a plurality of servers 12 each in communication with an associated Raritan Computer Peppercorn LARA Express device 22. Also, an n-port analog KVM device is employed to accommodate each of the Raritan Computer Peppercorn LARA Express devices 22 in communicating the KVM console 24.

Figure 5:
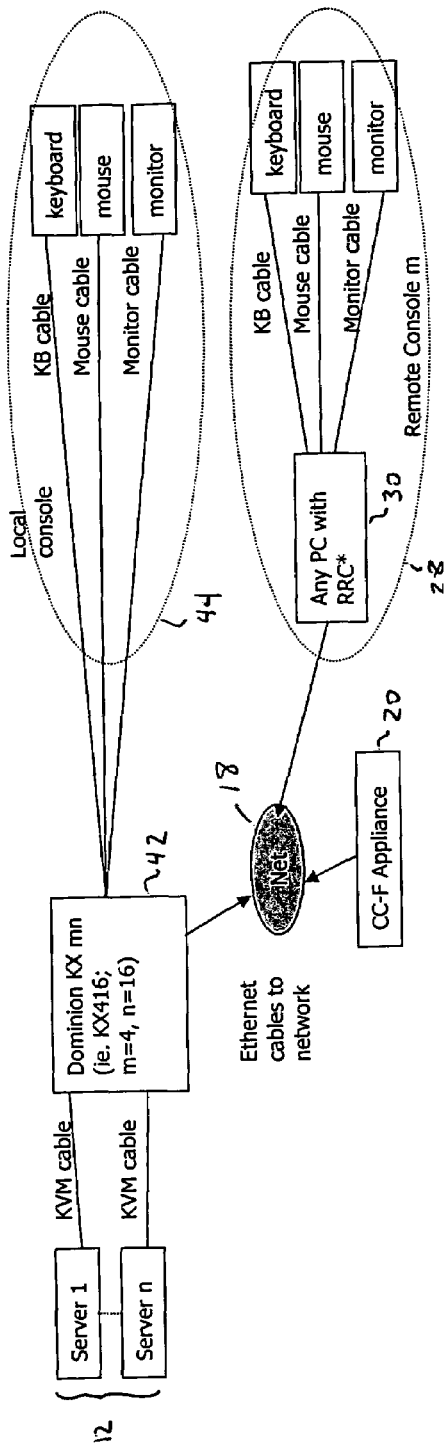
FIG. 5 is a schematic diagram of a command center forensics in accordance with a fourth embodiment, for which the redirector HW 14 is exemplified by a Raritan Computer Dominion KX Digital KVM switch.

Turning to FIG. 5, the redirector HW 14 of FIG. 1 is exemplified by Dominion KX digital KVM switch 42. The remote console 28 of FIG. 3 is likewise provided. The Dominion KX digital KVM switch 42 can allow a single local console 44 as well a multiple remote consoles 28 to communicate using remote client software such as that provided by Raritan Computer and sends an identical copy of active sessions to the CCF appliance 20 for storage. The values for m and n are exemplary and depend upon the models of Dominion KX digital KVM switch used.

Figure 6:
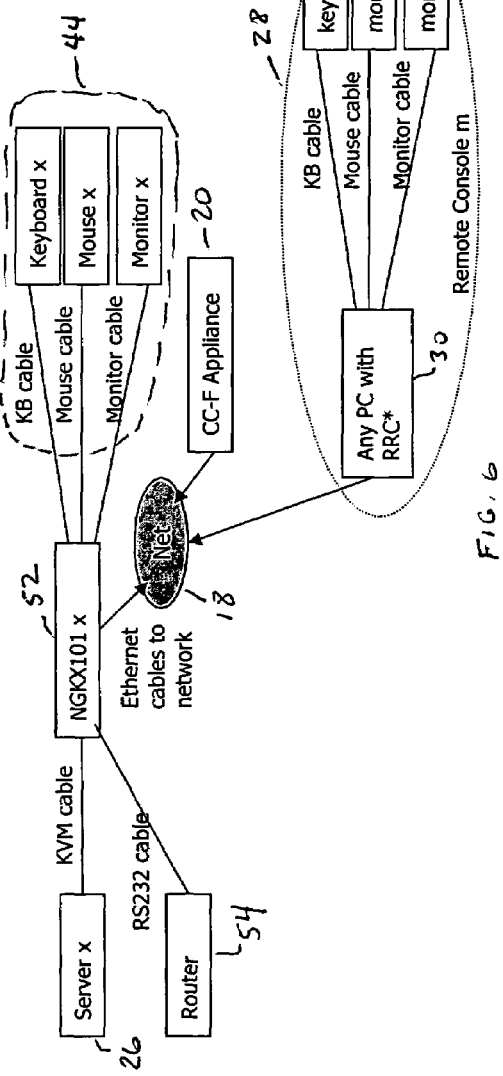
FIG. 6 is a schematic diagram of a command center forensics in accordance with a fifth embodiment, for which the redirector HW 14 is exemplified by a Raritan Computer NGKX101 switch.

Turning to FIG. 6, the redirector HW 14 of FIG. 1 is exemplified by a Raritan Computer NGKX101 switch 52 with serial console and remote console capabilities instead of the Dominion KX digital KVM switch 42 of FIG. 5. A router 54 may be provided to communicate with the NGKX101 switch 52 via RS-232 cable. As in FIG. 5, a local console 44 and a remote console 28 may be provided.

In a digital KVM switch setup in accordance with an embodiment of the invention, the digital KVM sends captured KVMoIP data to client machines running RRC so that the remote users can remotely control computers. RRC simply displays the video on screen, takes keyboard and mouse inputs and sends them to the redirector HW 14 to control the computer. To create a novel feature of the CCF appliance 20, KVMoIP data is written to disk instead of just displaying it on client software.

Redirector HW 14 preferably is synced with $3^{rd}$ party network time protocol (NTP) time servers for use in recording. Further, all KVM data being sent to the CCF appliance 20 preferably is time-stamped, strongly encrypted (secure sockets layer protocol (SSL), digital signatures), and include all possible identifiers such as the IP address of the Redirector HW 14. Also, if the Redirector HW is a KX KVM, the KVM data includes target server IP, server name, KX user name, and remote console IP if remote, or indication if local console used. The administrator can turn on and off SSL communication between redirector HW and CCF appliance for faster capture rate (SSL is CPU-intensive).

The CCF appliance 20 saves video data as a separate flat file while keyboard and mouse data are stored in a database for quick searching The administrator can setup profiles for each redirector HW 14 target. Profiles would have many defined settings such as items (1) to (9) as follows:

(1) Recording priority. Each CCF appliance 20 has a predetermined maximum number of simultaneous sessions being recorded. For example, a maximum of 8 sessions may be recorded simultaneously (set in software). However, an administrator can setup x>8 Redirector HW units. Therefore, the administrator should assign a priority to each redirector HW, from 1 to x, so that the CCF appliance 20 can record the highest priority sessions only.

(2) Keystroke recording. It can be set to RECORD ALL, RECORD NONE, FILTERED RECORD, FILTERED PLAYBACK. The first two are self-explanatory. FILTERED RECORD records only keyboard commands (i.e. CTRL+P, F7, CTRL+ALT+M, etc), but not plain text (alphanumeric keys without modifier keys. FILTERED PLAYBACK records all keystrokes, but does not display keystrokes on playback in the viewer. This is necessary for the search mechanism only (i.e., search for sessions with keystroke string "democrat" but will not be displayed on playback).

(3) Selecting video quality. The administrator can select color depth (2 bits to a15 bits), and distance between keyframes (full frame capture instead of delta only).

(4) Recording trigger. The administrator can set recording triggers: LOCAL PORT ACTIVITY (begins recording if keyboard, mouse or video activity is detected), REBOOT (if reboot is sensed by keyboard initialization and/or boot screen resolution change), and in the case of Dominion KX, KX101, and NGKX devices, USER LOGIN (records when certain user logs into the KVM), or TARGET CONNECTED (records when a certain target on the KVM is selected).

(5) Setting a duration of the recording. It can be until USER LOGS OFF, LOCAL PORT ACTIVITY TIMEOUT PERIOD in seconds, or PREDETERMINED TIME in dd:hh:mm:ss.

(6) Setting time to deletion
(7) Arranging viewing permissions
(8) Archiving permissions
(9) Configuring the CCF appliance 20 to communicate periodically with external syslog servers with time-stamps at least, or log all CCF events.

The CCF appliance 20 preferably has PCI-X slots so that end-users can upgrade it with add-in Fiber Channel cards to increase storage capacity. The CCF appliance 20 preferably supports Secure Deletion using DOD 522.22-M standard.

The CCF appliance 20 preferably has an undeletable log of all stored sessions files. It will keep track of the session file data, which users/administrators have viewed it, dates and times viewed, location (whether internal, archived externally, or deleted).

A browser-based application for searching and playback may be provided, including, preferably, a Java-based playback client. An SSL-encrypted link between the browser-based application and the CCF appliance 20 may be provided for security.

A searching mechanism may be provided for the browser-based application to search across multiple sessions as well as within sessions using:

If applicable, keystroke search, with results ranked (will include nearest hits, not just exact matches)
Mouse click patterns (double click, right click, etc)
Date, Time, User ID, Target IP or IP address
Boolean combination of any of the above Further, utility to print out keylogs and screen shots may be provided, as well as an application to transcode video to any standard video format.

Preferably, keystrokes and mouse clicks are displayed visually and session information such as User ID, Target ID, IP address, Date, Time, Duration, etc also is displayed on playback.

While the foregoing description and drawings represent the preferred embodiments of the present invention, it will be understood that various changes and modifications may be made without departing from the spirit and scope of the present invention.

What is claimed is:

1. A keyboard, mouse and video (KVM) session capture system, comprising:
    a computer interface module (CIM); and
    a forensic capture hardware (HW) module,
    wherein the CIM is configured to record at least one live KVM session, and to initiate sending a copy of the recorded at least one live KVM session to the forensic capture hardware module, and
    wherein the forensic capture hardware module is configured to store the copy of the recorded at least one live KVM session and to playback at least portions of the stored copy.

2. The KVM capture session system of claim 1, further comprising at least one server and at least one console in communication with each other so as to provide the at least one live KVM session, the at least one server and the at least one console being in communication with the computer interface module to enable recording of the at least one live KVM session by the forensic capture hardware (HW) module.

3. The KVM capture session system of claim 2, wherein there are a plurality of servers inclusive of the at least one server and a plurality of consoles inclusive of the at least one console each in communication with the computer interface module to enable recording by the forensic capture hardware (HW) module of all KVM sessions between any of the plurality of servers and any of the consoles.

4. The KVM capture session system of claim 1, wherein the forensic capture hardware (HW) module is configured to convert KVM signals to transmission control protocol/Internet protocol TCP/IP using keyboard, video and mouse over Internet protocol (KVMoIP).

5. The KVM capture session system of claim 1, wherein the forensic capture hardware (HW) module is configured to accommodate receipt of RS-232 data.

6. The KVM capture session system of claim 1, wherein the KVM session includes KVM data, at least one of the computer interface module and the forensic capture hardware (HW) modules being configured to time-stamp and encrypt the KVM data and include identifiers including an IP address of the forensic capture hardware (HW) modules.

7. The KVM capture session system of claim 1, wherein the KVM data includes target server internet protocol (IP), server name, user name, and either remote console IP or an indication of local console.

8. The KVM capture session system of claim 1, further comprising an administrator configured to selectively turn on and turn off a secure sockets layer protocol for communication between the computer interface module and the forensic capture hardware (HW) modules.

9. The KVM capture session system of claim 1, wherein the forensic capture hardware (HW) module is configured to save video data as a separate flat file and to save keyboard and mouse data in a database.

10. The KVM capture session system of claim 1, further comprising an administrator configured to setup profiles for the forensic capture hardware (HW) modules, the profiles being selected from a group consisting of priority of recording, keystroke recording, video quality selecting, recording trigger setting, recording duration setting, time to deletion setting, viewing permissions arranging, permissions archiving, periodic communicating with external servers having time stamps, and forensic capture hardware (HW) module event logging.

11. The KVM capture session system of claim 1, further comprising an administrator configured to setup profiles for the forensic capture hardware (HW) module, the profiles include keystroke recording and filtered playback of recorded keystrokes from the keystroke recording so as to prevent display of at least certain ones of the recorded keystrokes during playback.

12. The KVM capture session system of claim 1, wherein the forensic capture hardware (HW) module is configured to keep track of session file data, which users/administrators have viewed, dates and times viewed, location as to whether internal, archived externally, or deleted.

13. The KVM capture session system of claim 1, further comprising a browser-based application configured to search the stored identical copy and to playback results of the search; and a link containing a secure socket layer protocol between the browser-based application and the forensic capture hardware (HW) module.

14. The KVM capture session system of claim 1, further comprising a browser-based application configured to search the stored identical copy and to. playback results of the search, the browser-based application being configured to search across multiple sessions as well as within sessions using at least one search technique selected from a group consisting of keystroke search with results ranked, mouse click patterns, date, time, user identification, target Internet protocol, internet protocol address and a Boolean combination thereof.

15. The KVM capture session system of claim 1, further comprising a browser-based application configured to search the stored identical copy and to playback results of the search, the browser-based application is configured to search across multiple sessions as well as within sessions using a keystroke search with results ranked inclusive of newest hits.

16. The KVM capture session system of claim 1, further comprising a browser-based application configured to search the stored identical copy and to playback results of the search, the browser-based application being configured to search across multiple sessions as well as within sessions using mouse click patterns inclusive of double click, right click, left click.

17. A method of keyboard, mouse and video (KVM) session capture, comprising
    capturing HW that includes a computer interface module (CIM) capable of recording at least one live KVM session;
    sending a copy of the recorded at least one live KVM session to a forensic capture hardware module;
    storing the copy in the forensic capture hardware module, and playing back at least portions of the stored copy.

18. A method of claim 17, further comprising communicating at least one server and at least one console with each other so as to provide the at least one KVM session, and communicating the at least one server and the at least one console with the computer interface module (CIM) to enable recording of the at least one live KVM session by the forensic capture hardware module.

19. A method of claim 17, further comprising using the forensic capture hardware module to save video data as a separate flat file and to save keyboard and mouse data in a database.

20. A method of claim 17, further comprising setting up profiles for the forensic capture hardware module, the profiles are selected from a group consisting of priority of recording, keystroke recording, video quality selecting, recording trigger setting, recording duration setting, time to deletion setting, viewing permissions arranging, permissions archiving, periodic communicating with external servers having time stamps, and forensic capture hardware module event logging.

21. A method of claim 17, further comprising setting up profiles for the forensic capture hardware module, the profiles including keystroke recording and filtered playback of recorded keystrokes from the keystroke recording so as to prevent display of at least certain ones of the recorded keystrokes during playback.

22. A method of claim 17, further comprising using the forensic capture hardware module to keep track of session file data, which users/administrators have viewed, dates and times viewed, location as to whether internal, archived externally, or deleted.

23. A method of claim 17, further comprising searching the stored identical copy and displaying results from the searching.

24. A method of claim 17, further comprising searching the stored identical copy and playing back results of the search, the searching including searching across multiple sessions as well as within sessions using at least one search technique selected from a group consisting of keystroke search with results ranked, mouse click patterns, date, time, user identification, target Internet protocol, internet protocol address and a Boolean combination thereof.

25. A method of claim 17, further comprising searching the stored identical copy and playing back results of the search, the searching including using a keystroke search with results ranked inclusive of nearest hits.

26. A method of claim 17, further comprising searching the stored identical copy and playing back results of the search, the searching including using mouse click patterns inclusive of double click, right click, left click.

27. A method of claim 17, wherein the KVM session includes KVM data, further comprising time-stamping and encrypting the KVM data by using at least one of the a computer interface modules (CIM) and the forensic capture hardware module and providing identifiers.

* * * * *